United States Patent
Featonby et al.

(10) Patent No.: US 6,796,176 B2
(45) Date of Patent: Sep. 28, 2004

(54) INERTIAL SENSOR WITH AN INTEGRATED TEMPERATURE PROBE

(75) Inventors: Paul Featonby, Orsay (FR); Alain Renault, Pontoise (FR); Paul Vandebeuque, Argenteuil (FR)

(73) Assignee: Sagem SA, Paris (FR)

( * ) Notice: Subject to any disclaimer, the term of this patent is extended or adjusted under 35 U.S.C. 154(b) by 0 days.

(21) Appl. No.: 10/412,318

(22) Filed: Apr. 14, 2003

(65) Prior Publication Data

US 2004/0011131 A1 Jan. 22, 2004

(30) Foreign Application Priority Data

Apr. 12, 2002 (FR) .............................. 02 04590

(51) Int. Cl.[7] .............................. G01P 3/00; G01P 15/12
(52) U.S. Cl. ....................................... 73/497; 73/514.29
(58) Field of Search .............................. 73/514.29, 497, 73/514.18, 514.38, 862.59, 514.33; 310/321, 338

(56) References Cited

U.S. PATENT DOCUMENTS

| | | | | |
|---|---|---|---|---|
| 4,430,895 A | * | 2/1984 | Colton | 73/497 |
| 4,522,072 A | * | 6/1985 | Sulouff et al. | 73/765 |
| 5,020,370 A | | 6/1991 | Deval et al. | |
| 5,279,162 A | * | 1/1994 | Takebe et al. | 73/726 |
| 5,408,112 A | * | 4/1995 | Tai et al. | 257/254 |
| 5,780,742 A | | 7/1998 | Burns et al. | |
| 5,945,601 A | * | 8/1999 | Hosoi et al. | 73/514.33 |
| 5,962,786 A | * | 10/1999 | Le Traon et al. | 73/514.29 |
| 5,965,811 A | * | 10/1999 | Kawai et al. | 73/204.26 |
| 6,230,565 B1 | | 5/2001 | Foote | |

* cited by examiner

Primary Examiner—Helen Kwok
(74) Attorney, Agent, or Firm—Young & Thompson

(57) ABSTRACT

The acceleration detection sensor comprises a plate in which there are defined a support portion, at least one vibrating element carried by the support portion and sensitive to the movements to which the sensor is subjected, and at least one additional portion connected to the vibrating element and active in detecting acceleration, the sensor including a temperature probe comprising a conductive track which is fixed on at least the additional active portion and which is of resistance that varies as a function of ambient temperature.

10 Claims, 1 Drawing Sheet

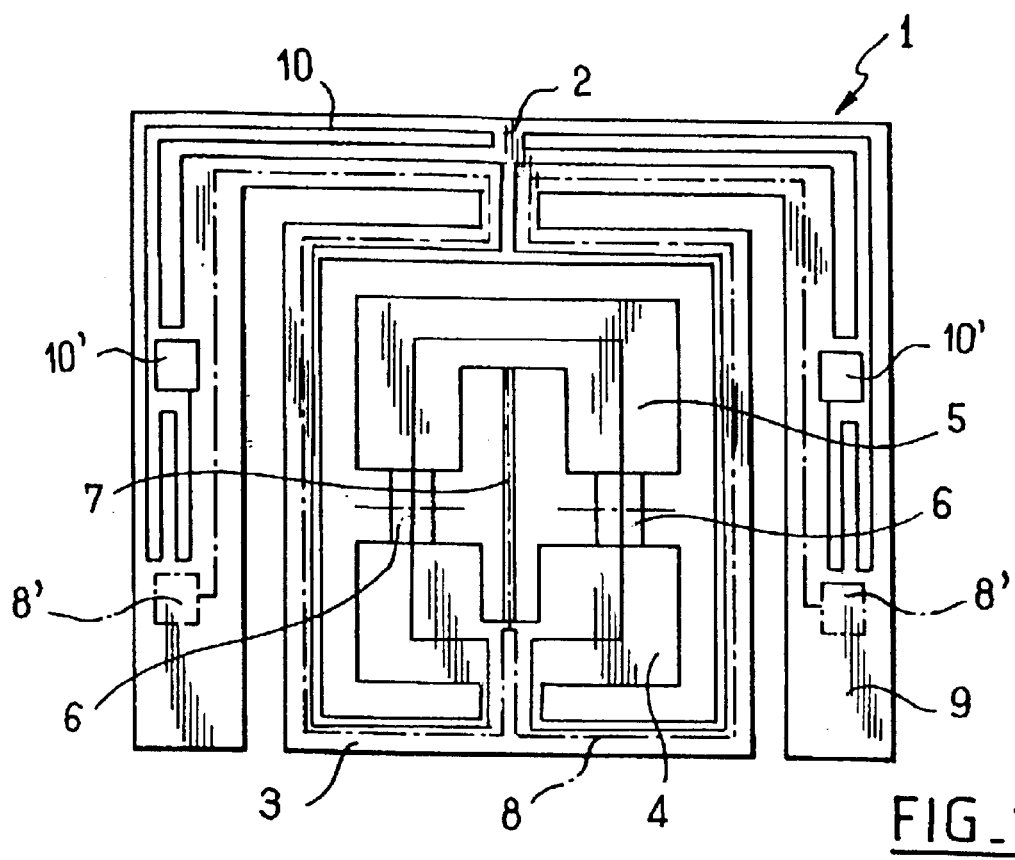
FIG_1
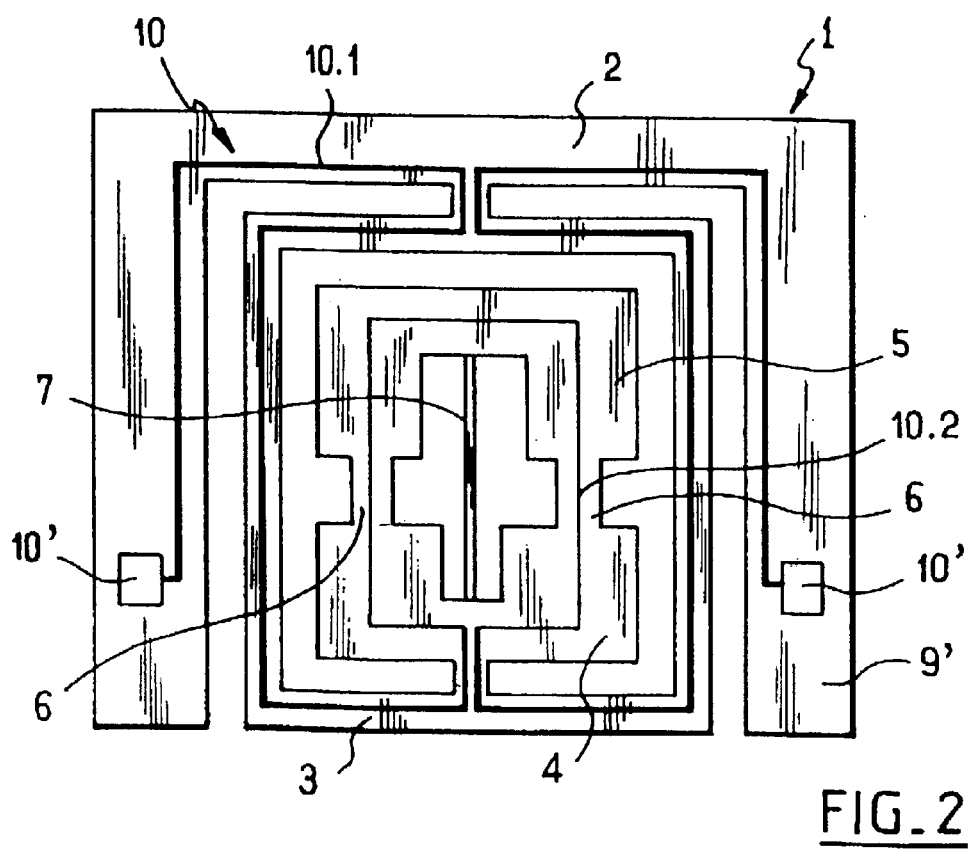
FIG_2

INERTIAL SENSOR WITH AN INTEGRATED TEMPERATURE PROBE

The present invention relates to inertial sensors, in particular accelerometers and gyros.

The invention relates more particularly to sensors comprising a sensing cell having a plate in which there are defined a portion forming a support member and at least one vibrating element associated with excitation means. The excitation means enable the vibrating elements to be set into vibration and enable its vibration frequency to be detected.

BACKGROUND OF THE INVENTION

With an accelerometer, the inertial element is connected to the vibrating element. The inertial element is a mass, itself defined in the plate and movable relative to the support member. When the sensor is subjected to acceleration, the mass exerts a force on the vibrating element. This force modifies its frequency of vibration in such a manner that variation in the frequency of vibration of the vibrating element can be used for determining the acceleration to which the sensor is subjected.

Nevertheless, it has been found that temperature variations also give rise to variations in the frequency of vibration of the vibrating element.

In order to be able to obtain an accurate measurement of acceleration, it is therefore necessary to determine the influence both of acceleration and of temperature on the variation in the frequency of vibration.

To do this, it is known to associate a temperature sensor with the acceleration sensor. Nevertheless, because acceleration sensors of the above-specified type are compact, known temperature sensors need to be mounted separately from the sensing cell. Unfortunately, it is found firstly that the temperature gradient inside the sensor, and secondly that the time lag between a change in the temperature of the vibrating element and a corresponding change in the temperature of the probe are too great to enable the measured temperature to determine the influence of temperature on variation in the frequency of vibration in a manner that is reliable.

Document U.S. Pat. No. 5,020,370 discloses a transducer comprising a plate having two vibrating elements defined therein, with ends that are secured to support portions for fixing to a structure and to a mass. A temperature probe constituted by a conductive track extends over a beam connected to at least one of the support portions and extending parallel to the vibrating elements. Temperature is thus measured close to the vibrating elements. Nevertheless, the beam supporting the temperature probe runs the risk of affecting the mechanical behavior of the transducer, and thus of affecting the sensitivity of the transducer to acceleration.

OBJECT OF THE INVENTION

An object of the invention is to provide a sensor that minimizes errors due to temperature variations.

BRIEF SUMMARY OF THE INVENTION

In order to achieve this object, the invention provides a sensor for detecting acceleration, the sensor comprising a plate in which there are defined a support portion, at least one vibrating element carried by the support portion and sensitive to the movements to which the sensor is subjected, and at least one additional portion connected to the vibrating element and active in detecting acceleration, the sensor including a temperature probe comprising a conductive track which is fixed on at least the additional active portion and which is of resistance that varies as a function of ambient temperature.

Thus, temperature can be determined accurately and very close to the vibrating element, by measuring the resistance of the conductive track, and it can be taken into account in order to determine in reliable manner the respective contributions of temperature and of sensor movement in the variation of the frequency of vibration of the vibrating element.

The temperature probe preferably extends symmetrically relative to the vibrating element.

This minimizes errors that might result from a temperature gradient inside the sensor.

Other characteristics and advantages of the invention appear on reading the following description of a particular, non-limiting embodiment of the invention.

BRIEF DESCRIPTION OF THE DRAWING

Reference is made to the accompanying drawing, in which:

FIG. 1 is a plan view of an acceleration sensor in accordance with the invention; and FIG. 2 gives a view analogous to FIG. 1, showing a variant embodiment of an acceleration sensor.

DETAILED DESCRIPTION OF THE INVENTION

With reference to FIG. 1, the acceleration sensor comprises a plate given overall reference 1 and made of piezoelectric quartz, having defined therein in conventional manner a support portion 2 for fixing in a case, a decoupling frame 3 having one side secured to the support member 2 and an opposite side connected to a mass 4, a mass 5 connected to the mass 4 via hinges 6, and a vibrating element 7 having ends secured to the masses 4 and 5. The hinges 6 are formed by deformable tabs formed in the plate 1 with axes lying in the plane of the figure so that the sensing direction of the sensor is substantially normal to said plane. The decoupling frame 3, the mass 4, the mass 5, and the hinges 6 form additional portions that are active in detecting acceleration, in the sense that they co-operate with the vibrating element in the function of detecting acceleration.

The sensor comprises a piezoelectric excitation circuit 8 for exciting the vibrating element 7 and symbolized in the figure by a chain-dotted line which is arranged in known manner so as firstly to set the vibrating element 7 into vibration at a determined frequency, and secondly to detect variations in the frequency of vibration of the vibrating element 7. The circuit 8 extends over one face 9 of the plate 1 and has terminals 8' for connection to an electronics module (not shown) for controlling the sensor.

The sensor also comprises a temperature probe which is constituted by a conductive track 10 symbolized in the figure by a continuous line, which in this embodiment extends on the face 9 of the plate 1 in the support member 2 and in the additional active portions.

The conductive track 10 is made of a material whose conductivity varies as a function of temperature, specifically gold or a gold alloy. If necessary, the conductive track 10 has sinuous portions in order to ensure that the conductive track is of a length compatible with a resistance that is appropriate for proper operation of the electronics for measuring temperature and calculating the corresponding temperature compensation.

The conductive track 10 is preferably symmetrical about the vibrating element so that temperature measurement error is minimized in the event of there being a temperature gradient inside the sensor case.

The conductive track 10 has terminals 10' for connection to the electronics module controlling the sensor.

The circuit 8 and the conductive track 10 are both made of the same metal in this case and they can be made either by localized deposition of metal on the plate 1 in order to form the circuit 8 and the conductive track 10, or else by covering the faces of the plate 1 in a layer of metal and subsequently attacking or etching it using conventional techniques in order to form the circuit 8 and the conductive track 10.

The sensor control module is arranged firstly to control the excitation circuit 8 and process the information relating to the frequency of vibration of the vibrating element 7, and secondly to determine temperature on the basis of the resistance of the conductive track 10 in order to be able to distinguish in the frequency of the vibrating element 7 the contribution that results from temperature and the contribution that results from the force exerted on the vibrating element 7 by the mass 5 which is itself subjected to acceleration.

Naturally, the invention is not limited to the embodiment described, and various embodiments can be applied without going beyond the ambit of the invention as defined by the claims.

In particular, the invention applies to any vibrating element sensor. Thus, although the sensor described is made using a plate of quartz and implements the piezoelectric effect, the sensor could be made using a plate of silicon with the vibrating element being excited in capacitive, magnetic, or thermoelectric, or other manner. The method of manufacturing such a sensor is analogous to that described above.

Although the sensor is described as having an inertial element in the form of a mass 5 in order to make an accelerometer, the temperature probe of the invention can be used in association with any kind of inertial element, for example a gyro for constituting a rotary sensor.

Similarly, although the invention is described for an embodiment in which the vibrating element has one end connected to the support member via a mass and a decoupling frame, the invention applies to any configuration of the vibrating element, for example to sensors having vibrating elements that are associated in the manner of a tuning fork.

The conductive track forming the temperature probe may extend over all of the additional active portions, or over some of them only.

When a plurality of acceleration sensors are defined in a single plate, a respective temperature measuring conductive track may be associated with each sensor, or with groups of a plurality of sensors. The information supplied by the temperature probe(s) may be used in combination with the resonant frequencies of the vibrating elements in order to calculate accurately the temperature of at least one of the vibrating elements.

Although the conductive track forming the temperature probe is shown in FIG. 1 as being disposed on the same face 9 of the plate 1 as the excitation circuit, thereby making fabrication easier, the temperature probe could be disposed on the face 9' of the plate 1 that is opposite its face 9, as in the variant embodiment of FIG. 2. This makes it possible to place the temperature probe even closer to the vibrating element 7. Thus, the conductive track 10 extends over the support member 1, the decoupling frame 3, and the masses 4 and 5. It should be observed that the conductive track 10 in this case possesses a broad portion 10.1 (symbolized by a bold line) which extends over the support member 2 and the decoupling frame 3 and a narrow portion 10.2 (symbolized by a fine line) which extends over the masses 4 and 5. The narrow portion 10.2 is thus of greater resistance than the broad portion 10.1 so that variations in resistance as a function of temperature are greater on the narrow portion 10.2. As a result, the temperature in the vicinity of the vibrating element 7 has a greater effect in the measurement performed. It is also possible to have one or more portions of non-constant width on the masses, the support member, or the decoupling frame. In order to have a portion arranged to present greater resistance, it is also possible, in general manner, to reduce the cross-section of said portion (e.g. by reducing the thickness of the portion), or by using a metal of conductivity different from the conductivity of the other portions of the conductive track.

What is claimed is:

1. A sensor for detecting acceleration, comprising:
   a plate having a support portion;
   a mass connected by at least one hinge to the support portion;
   at least one vibrating element having a first extremity connected to the support portion and a second extremity connected to said mass portion;
   an excitation circuit which extends on the plate and is connected to the vibrating element; and
   a temperature probe comprising a conductive track which is of a resistance that varies as a function of ambient temperature and which has a portion fixed on at least the hinge and the mass.

2. The sensor according to claim 1, wherein the temperature probe extends symmetrically relative to the vibrating element.

3. The sensor according to claim 1, wherein the portion of the conductive track fixed on at least the hinge and the mass has a high resistance in the vicinity of the vibrating element.

4. The sensor according to claim 3, wherein said portion of the conductive track has a smaller cross section than other portions of said conductive track.

5. The sensor according to claim 1, wherein the first extremity of the vibrating element and the hinge of the mass are connected to the support portion by a decoupling frame disposed between the support portion, the hinge and the vibrating element, said portion of the conductive track fixed on the hinge and the mass extending on the decoupling frame.

6. The sensor fore detecting acceleration, comprising:

a plate having a support portion and a decoupling frame carried by the support portion;

a mass connected to the decoupling frame by at least one hinge;

at least one vibrating element having a first extremity connected to said decoupling frame and a second extremity connected to said mass; and a temperature probe comprising a conductive track which is of a resistance that varies as a function of ambient temperature and which has a portion fixed on each of the mass, the hinge, and the decoupling frame.

7. The sensor according to claim 6, wherein the temperature probe extends symmetrically relative to the vibrating element.

8. The sensor according to claim 6, wherein said portion of the conductive track has a higher resistance in the vicinity of the vibrating element.

9. The sensor according to claim 8, wherein the portion presenting higher resistance has a smaller cross-section than other portions of said conductive track.

10. The sensor for detecting acceleration, comprising:

a plate having a support portion;

a mass connected by at least one hinge to the support portion;

at least one vibrating element having a first end connected to the support portion and a second end connected to said mass portion;

an excitation circuit which extends on the plate and is connected to the vibrating element; and a temperature probe comprising a conductive track that is of a resistance that varies as a function of ambient temperature and that has a portion extending on at least the hinge and the mass and that substantially surrounds said vibrating element.

\* \* \* \* \*